US 7,872,654 B2

United States Patent
Scapel et al.

(10) Patent No.: US 7,872,654 B2
(45) Date of Patent: Jan. 18, 2011

(54) ANIMATING HAIR USING POSE CONTROLLERS

(75) Inventors: Nicolas Scapel, Pasadena, CA (US); Terran Boylan, Los Angeles, CA (US); Daniel Lee Dawson, San Francisco, CA (US)

(73) Assignee: DreamWorks Animation LLC, Glendale, CA (US)

( * ) Notice: Subject to any disclaimer, the term of this patent is extended or adjusted under 35 U.S.C. 154(b) by 0 days.

(21) Appl. No.: 12/127,771

(22) Filed: May 27, 2008

(65) Prior Publication Data

US 2008/0297519 A1  Dec. 4, 2008

Related U.S. Application Data

(62) Division of application No. 10/989,955, filed on Nov. 15, 2004, now abandoned.

(51) Int. Cl.
  *G06T 15/70* (2006.01)
(52) U.S. Cl. ........................ 345/473; 345/418; 345/419; 345/420; 345/474; 345/475
(58) Field of Classification Search ........................ None
  See application file for complete search history.

(56) References Cited

U.S. PATENT DOCUMENTS

| 6,720,962 B1 | 4/2004 | Alter |
| 6,952,218 B1 | 10/2005 | Bruderlin |
| 7,003,061 B2 | 2/2006 | Wilensky |

OTHER PUBLICATIONS

Title: Modeling Dynamic Hair as a Continuum, Author: Hadap et al., Date: 2001, pp. 1-10.*
Alias Systems Corp. (2004). "Maya 6 Product Brochure," located at <http://www.alias.com/eng/products-services/maya/file/maya6_features_in_detail.pdf>visited on Apr. 5, 2005, 12 pages.
Alias Systems. (2004). "Maya Help Online," located at <http://anim.dreamworks.com:4446/Maya6.0/en_US/> visited on Dec. 10, 2004, 2 pages.
Alter, J. (1999-2004). "Shave and a Haircut Version 2.7," located at <http://www.joealter.com/newSite/softloads/Manual.pdf> visited on Nov. 30, 2004, pp. 1-75.

(Continued)

*Primary Examiner*—Kee M Tung
*Assistant Examiner*—Jwalant Amin
(74) *Attorney, Agent, or Firm*—Morrison & Foerster LLP

(57) ABSTRACT

The present invention deforms hairs from a reference pose based on one or more of the following: magnet position and/or orientation; local reference space position (e.g., a character's head or scalp); and several profile curves and variables. In one embodiment, after an initial deformation is determined, it is refined in order to simulate collisions, control hair length, and reduce the likelihood of hairs penetrating the surface model. The deformed hairs can be rendered to create a frame. This procedure can be performed multiple times, using different inputs, to create different hair deformations. These different inputs can be generated based on interpolations of existing inputs. Frames created using these deformations can then be displayed in sequence to produce an animation. The invention can be used to animate any tubular or cylindrical structure protruding from a surface.

20 Claims, 14 Drawing Sheets

OTHER PUBLICATIONS

Barr, A. H. (Jul. 1984). "Global and Local Deformations of Solid Primitives," *Computer Graphics* 18(3):21-30.

Bruderlin, A. (Jul. 2003). "A Basic Hair/Fur Pipeline," *The 30th International Conference on Computer Graphics and Interactive Techniques* (*SIGGRAPH* 2003), San Diego, CA, 13 pages.

Buhler, J. et al. (Mar. 27, 2001). "Visual Effects in Shrek," located at <http://siliconvalley.siggraph.org/MeetingNotes/Shrek.html> visited on Nov. 19, 2004, 3 pages.

Chang, J. T. et al. (2002). "A Practical Model for Hair Mutual Interactions," *Proceedings of the 2002 ACM SIGGRAPH/Eurographics Symposium on Computer Animation*, pp. 73-80.

Daldegan, A. et al. (1993). "An Integrated System for Modeling, Animating and Rendering Hair," *Computer Graphics Forum* 12(3):211-221.

Discreet. (2004). "3ds Max 7 Product Brochure," located at <http://www4.discreet.com/files/3dsmax/3dsmax7_brochure.pdf> visited on Dec. 10, 2004, 6 pages.

Fisher, B. (May 5, 1999). "Parametric Deformation Models," located at <http://homepages.inf.ed.ac.uk/rbf/CVonline/LOCAL_COPIES/ZHONG1/node9.html> visited on Apr. 5, 2005, 2 pages.

Gibbs, J. (Mar. 2001). "Rendering Skin and Hair," PDI/Dreamworks, located at <http://siliconvalley.siggraph.org/MeetingNotes/shreklhairskin.pdf> visited on Nov. 30, 2004, 19 pages.

Hadap, S. et al. (2001). "Modeling Dynamic Hair as a Continuum," *Eurographics* 2001 20(3), 10 pages.

Hadap, S. et al. (Jul. 2003). "Hair Shape as Streamlines of Fluid Flow," *The 30th International Conference on Computer Graphics and Interactive Techniques* (*SIGGRAPH* 2003), San Diego, CA, pp. 1-21.

Hanson, A. J. et al. (Jan. 11, 1995). "Parallel Transport Approach to Curve Framing," Technical Report 425, Indiana University, Department of Computer Science, pp. 1-20.

Kim, T.-Y. et al. (2002). "Interactive Multiresolution Hair Modeling and Editing," *ACM Transactions on Graphics* 21(3):620-629.

Kim, T.-Y. et al. (Jul. 2003). "Algorithms for Hardware Accelerated Hair Rendering," *The 30th International Conference on Computer Graphics and Interactive Techniques* (*SIGGRAPH* 2003), San Diego, CA, 22 pages.

Lee, D.-W. et al. (2001). Natural Hairstyle Modeling and Animation, *Graphical Models* 63:67-85.

Liang, W. et al. (Oct. 2003). "An Enhanced Framework for Real-time Hair Animation," *11th Pacific Conference on Computer Graphics and Applications* (*PG'03*), Canmore, Canada, 5 pages.

Magnenat-Thalmann, N. et al. (2004). "Animating Hair With Free-Form Deformations," *ACM Symposium on Virtual Reality Software and Technology*, Hong Kong, 18 pages.

Magnenat-Thalmann, N. et al. (Aug. 2004). "Notes from Course 9: Photorealistic Hair Modeling, Animation, and Rendering," *The 31st International Conference on Computer Graphics and Interactive Techniques* (*SIGGRAPH* 2004), Los Angeles, CA, 271 pages.

Magnenat-Thalmann, N. et al. (Jul. 2003). "Notes from Course 34: Photorealistic Hair Modeling, Animation and Rendering," *The 30th International Conference on Computer Graphics and Interactive Techniques* (*SIGGRAPH* 2003), San Diego, CA, 126 pages.

Magnenat-Thalmann, N. et al. (Jun. 2002). "State of the Art in Hair Simulation," *International Workshop on Human Modeling and Animation*, Seoul, Korea, 7 pages.

Maxon. (2005). "Shave and a Haircut 2.5—FAQ," located at <www.maxon.net/pages/products_3rd/shave/shave_faq_e.html> visited on Mar. 30, 2005, 2 pages.

Maxon. (Mar. 2, 2004). "Press Release—Shave 2.5 Ships for Cinema 4D," <http://www.maxon.net/pages/dyn_files/dyn_htx/htx/900/00900_00900.html> visited on Mar. 30, 2005, 2 pages.

NewTek. (2004). "Lightwave 3D Product Info," located at <http://www.newtek.com/products/lightwave/product/description.html> visited on Dec. 10, 2004, 2 pages.

Noble, P. et al. (2004). "Modeling and Animating Cartoon Hair with NURBS Surfaces," *IEEE Proceedings of the Computer Graphics International*, 8 pages.

Patrick, D. et al. (2003). "A LightWave 3D Plug-in for Modeling Long Hair on Virtual Humans," *Proceedings of the 2nd International Conference on Computer Graphics, Virtual Reality, Visualisation and Interaction in Africa*, pp. 161-166, 188.

Rijpkema, H. (Aug. 2004). "Fur Grooming at Rhythm and Hues Studios," *The 31st International Conference on Computer Graphics and Interactive Techniques* (*SIGGRAPH* 2004), Los Angeles, CA, 7 pages.

Softimage Research & Development and Product Management. "Key New Features XSI Version 4.0," located at <http://www.softimage.com/products/Xsi/v4/features/XSI_v40_new_features.pdf> visited on Dec. 10, 2004, pp. 1-29.

Steamboat Software, Inc. "Hair Geometry Engine," located at <http://www.steamboat-software.com/Support/archive/hair/Hair_Geometry_Engine_Page_1.html> visited Nov. 30, 2004, 45 pages.

Steamboat Software, Inc. "Photorealistic Hair Rendering," located at <http://www.steamboat-software.com/jighair.html> visited on Jul. 28, 2003, 1 page.

Steamboat Software, Inc. "What is Jig?," located at http:/www.steamboat-software.com/jigwhat.html> visited on Jul. 28, 2003, 2 pages.

Turbo Squid, Inc. (2004). "Plug-ins Other Hair Procedural Fur," located at <www.turbosquid.com/FullPreview/index.cfm/ID/229960> visited on Nov. 19, 2004, 4 pages.

Volino, P. et al. (Nov. 2004). "Animating Complex Hairstyles in Real-Time," *Proceedings of the ACM symposium on Virtual Reality Software and Technology* (*VRST*), pp. 41-48.

Ward, K. et al. (May 2003). "Modeling Hair Using Level-of-Detail Representations," *Proceedings of the 16th International Conference on Computer Animation and Social Agents* (*CASA '03*), New Brunswick, NJ, 7 pages.

Ward, K. et al. (Oct. 2003). "Adaptive Grouping and Subdivision for Simulating Hair Dynamics," *11th Pacific Conference on Computer Graphics and Applications* (*PG'03*), Canmore, Canada, 10 pages.

Yu, Y. et al. (2002). "Efficient and Realistic Hair Animation Using Sparse Guide Hairs," Technical Report: UIUCDCS-R-2002-2312, University of Illinois at Urbana-Champaign, pp. 1-19.

\* cited by examiner

ANIMATING HAIR USING POSE CONTROLLERS

BACKGROUND OF THE INVENTION

1. Field of the Invention

This invention relates generally to computer graphics and, more specifically, to using computer systems to animate hair.

2. Background Art

Computers are widely used to model and animate figures, from insects and monsters to human beings. Many of these figures have hair or fur attached to their bodies. In the past, when such a figure was animated, its body would move, but its hair or fur would remain stationary relative to its body position. Now, software has been developed to animate hair and, as a result, make character animation more realistic. Hair animation software can also be used to show hair responding to a variety of forces, such as a gust of wind or a character pulling at the hair.

There are a number of difficulties in modeling and animating hairs. First, a figure is often covered by thousands of strands of hair or fur. This means that the strands cannot all be created and positioned manually without requiring substantial time and expense. In addition, it means that animating the hair can involve a signification amount of computation, since the shape and position of each hair at each frame has to be computed. Second, human hair is even more difficult to model than fur because of its length and the variety of possible styles. A real human head contains about 100,000-200,000 strands of hair. And for each head of hair, there are dozens, if not hundreds, of possible hairstyles.

The first step in creating an animated sequence is often creating a model of a character. There are many options for modeling the hair or fur of the character, including the type of strands and the hairstyle. Strands can vary in length, waviness, and thickness, and hairstyles can vary in terms of shape, numbers of strands, and how the strands are attached to the character. The hair animation system should not limit the hair model. Rather, the system should be flexible enough to be used with many types of strands and many types of hairstyles.

Traditionally, hair animation systems have required strands to be of a certain type, such as long and straight. Hair animation systems have also been designed for use with a particular hairstyle or even a particular character. This lack of flexibility severely affects the creative process. Not only does it restrict what a model can look like, it also inhibits making changes to the model later on in the creative process, since the animation that was created for the first model may not work for the modified model.

Once a model has been created, a user should be able to control the animation of its hair. The animation should be realistic, reflecting the fact that while one force may act upon several strands of a hairstyle, not all of the strands will react in exactly the same way. For example, if a character is facing into the wind, its hair will generally be blown backwards. However, different strands of hair can move in slightly different directions, as happens in real life. The user should be able to control this animation, including controlling whether to take into account the effects of gravity on hair movement. Also, when the movement has ended, the hair should return to its original hairstyle, albeit with whatever changes in shape and position would result from such movement.

In the past, hair has been animated using physically-based simulations, such as modeling a strand of hair as a mass-spring system with multiple joints and segments. Physically-based simulations can be computationally expensive to a prohibitive extent and sometimes become unstable. In addition, physically-based simulations often enable little or no user control over the resulting animation.

What is needed is a hair animation system that is flexible enough to be used with many types of strands and many types of hairstyles and that animates hair in a realistic, controllable way.

SUMMARY OF THE INVENTION

Animation comprises the display of multiple images (frames) in succession. Movies display frames at a rate of twenty-four frames per second. With such a high frame rate, hundreds or even thousands of frames are required for an animated sequence. Creating these frames manually is very time-consuming.

One option is to manually create a model and then render the model using software. However, this too takes a lot of time. One solution, called parametric deformation, is to create a "reference" model of the object and then use deformation software to deform (modify) the reference model based on one or more parameters. In character animation, these parameters are sometimes referred to as pose controllers, since they can control a character's pose. When the values of the pose controllers are input into the deformation software, the reference model is deformed. This deformed model can then be rendered to generate a frame.

While parametric deformation is faster than manual deformation, it is still time-consuming to determine values for the pose controllers so that enough frames are produced. Parametric keyframing is an animation technique where values for a pose controller are determined at key times and then other values for the pose controller are interpolated accordingly. These values are then input into the deformation software in order to produce the necessary deformed models. For example, a user can specify one or more values for a pose controller. These values will then be interpolated to generate other values for the pose controller. In one embodiment, the user can specify what type of interpolation should be used to generate new values (e.g., linear interpolation, spline interpolation, or polynomial interpolation). The user can also adjust the interpolation so that different interpolated values are generated.

In one embodiment, parametric keyframe techniques are used to animate hair. A surface model, hairs, and values for one or more pose controllers are input into a software component called a wig system. The wig system deforms the hairs, which can then be rendered to create a frame. This procedure can be performed multiple times, using different values for the pose controllers, to create different hair deformations. These different values are created by interpolating keyframed values for the pose controllers. Frames created using these deformations can then be displayed in sequence to produce an animation.

The hair deformation can vary based on one or more of the following: magnet position and/or orientation; position of a local reference space (such as a character's head); position of a surface model reference space (such as a character's scalp); and several profile curves and other variables. In one embodiment, after an initial deformation is determined, it is refined. This refinement can include simulating collisions between hairs and other objects, controlling the length of hairs, and reducing the likelihood that hairs will penetrate the surface model.

The figures depict one embodiment of the present invention for purposes of illustration only. One skilled in the art will readily recognize from the following discussion that alternative embodiments of the structures and methods illustrated herein can be employed without departing from the principles of the invention described herein.

DETAILED DESCRIPTIONS OF THE EMBODIMENTS

For simplicity purposes, the invention is described in the context of modeling hairs on a human head. However, the invention may be used to model any tubular or cylindrical structure protruding from a surface, such as strands of fur protruding from an animal's skin, strands of fibers protruding from a carpet, and blades of grass or stems of plants protruding from the ground. For purposes of generality, the terms "strand" and "hair" are used herein interchangeably and include hair, fur, grass, stems, fibers, follicles, and any similar tubular or cylindrical structures protruding from a surface.

Animation Using a Pose Controller

Figure 1:
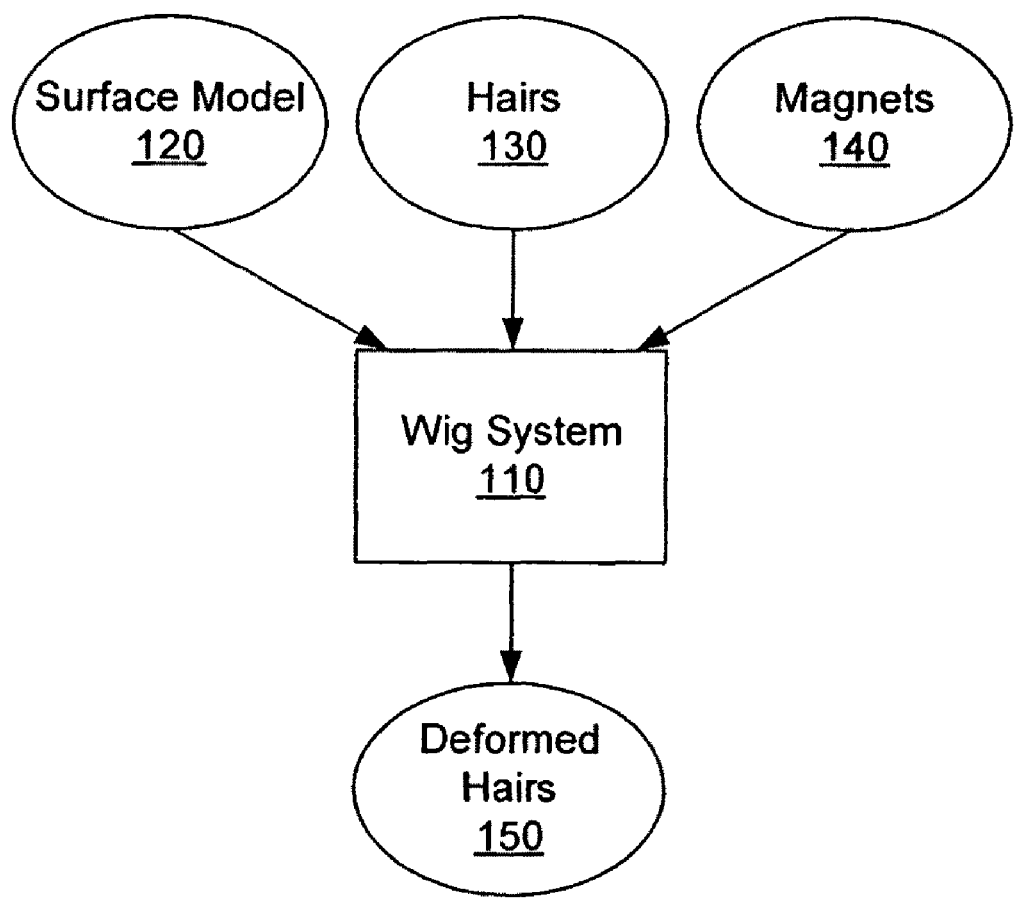
FIG. 1 illustrates a block diagram overview of the use of a software component for deforming hair.

In one embodiment, parametric keyframe techniques are used to animate hair. FIG. 1 illustrates a block diagram overview of the use of a software component for deforming hair. FIG. 1 includes a wig system 110, a surface model 120, hairs 130, magnets 140, and deformed hairs 150. Wig system 110 is a software component used to deform hair. The inputs of the wig system 110 are a surface model 120, one or more hairs 130, and one or more magnets 140. The output of the wig system 110 is deformed hairs 150.

One of the inputs to the wig system 110 is a surface model 120. The surface model 120 is the surface to which the hairs are attached. In the hair context, the surface model is typically part of a character, such as a character's head. In the grass context, the surface model would be a field or other region of ground or land. The surface model can be built using a variety of methods known to those skilled in the art, such as scanning or creating a model from scratch using a computer graphics product such as Maya® from Alias Systems. The surface model can comprise, for example, polygons, parametric surfaces (such as NURBS (NonUniform Rational B-Splines)), and/or subdivision surfaces.

In one embodiment, parametric keyframe techniques are used to animate hair. FIG. 1 illustrates a block diagram overview of the use of a software component for deforming hair. FIG. 1 includes a wig system 100, a surface model 120, hairs 130, magnets 140, and deformed hairs 150. Wig system 110 is a software component used to deform hair. The inputs of the wig system 110 are a surface model 120, one or more hairs 130, and one or more magnets 140. The output of the wig system 110 is deformed hairs 150. It should be recognized that the software component may be implemented as computer-executable instructions that are encoded in a computer-readable storage medium.

Another input to the wig system 110 is one or more hairs 130. In real life, a hair is usually thought of as a curved line. In the wig system 110, a hair is a set of vertices. A vertex of a hair has three values associated with it: an x-coordinate, a y-coordinate, and a z-coordinate. Together, these three values describe the position of the vertex in three-dimensional space. Although the position of a hair is specified at only its vertices, the position of the rest of the hair is determined by interpolating a curve through the vertices. This interpolation forms a curved three-dimensional line. Examples of curve interpolations include B-splines and NURBS. Hairs within the wig system 110 can include, for example, any type of parametric curve or subdivision curve. A hair that is modeled on a surface, such as the hairs that are inputs and outputs of wig system 110, also has a base attachment point. This point is defined as where the interpolated curve intersects the surface model 120.

The shapes and positions of the hairs 130 that are input into the wig system 110 constitute a "reference pose." This reference pose can be thought of as an initial state, before deformation has occurred. When a hair deforms, its shape and/or position can change from a first value to a second value. The first value can correspond to the reference pose, while the second value can correspond to the "deformed pose." In one embodiment, all deformations of a character are determined from a single reference pose.

The third input to the wig system 110 is one or more magnets 140. A magnet 140 can be thought of as a pose control. It affects how hairs 130 that are input into the wig system 110 are deformed to make the deformed hairs 150 that are output by the wig system 110. A magnet 140 is located at a point in three-dimensional space and is directional. In other words, a magnet has both a position and an orientation. In one embodiment, a magnet's position and orientation are encoded as an affine transformation (e.g., in a four-by-four matrix). A magnet controls hair deformation by moving from one point to another (translation) and/or changing direction (rotation). Magnets 140 will be further discussed below.

After the wig system 110 has created deformed hairs 150, the model can be further processed. For example, the hairstyle can be "filled in" by interpolating the deformed hairs 150 to create additional hairs. Hairs can also be processed in order to add special effects such as lighting and shadows, for example, by inputting the hairs into a rendering engine.

At this point, two hairstyle poses exist: the reference pose (i.e., the input hairs 130) and one deformed pose (i.e., the deformed hairs 150). The deformed pose can be used to generate a frame. If additional frames of the hair are desired (e.g., to produce an animation), the values of pose controllers are keyframed. These pose controllers can be, for example, magnets 140 or joints that control the character model. Multiple values of a pose controller (e.g., a magnet location) are determined. For a given pose controller, these values include the start value of the controller, the end value of the controller, and one or more intermediate values. Intermediate values of one or more pose controllers are then input into the wig system 110, along with the original surface model 120 and hairs 130. The wig system 110 produces deformed hairs 150 that can be rendered to generate an additional frame for hair animation. In this way, the wig system 110 can be used to create any number of hair frames to use for animation.

Figure 2:
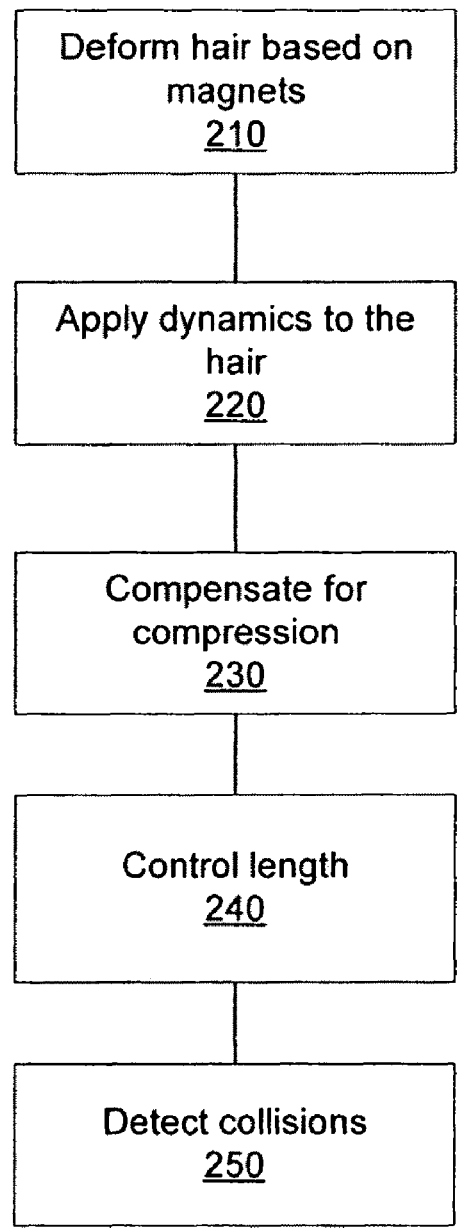
FIG. 2 illustrates a flowchart of a method for deforming hair performed by the above software component.

FIG. 2 illustrates a flowchart of a method for deforming hair performed by the above software component. In one embodiment, the wig system 110 deforms hair in three phases. The first phase is concerned with the general movement of several strands (also known as "animation"), such as being acted upon by gravity or being blown backwards when a character is facing a gust of wind. This phase, which controls primary movement, includes deforming 210 the hair 130 based on the magnets 140. The second phase is concerned with creating subtle variations in movement among hairs, which makes animation of uniform hairstyles (such as long, straight hair) more lifelike. This phase, which controls secondary movement, is "layered" on top of primary movement and includes applying 220 dynamics to the hair. The third phase is concerned with refining the deformation caused by the first two phases and includes compensating 230 for compression, controlling 240 length, and detecting 250 collisions. These operations will be further described below. Note that while the illustrated embodiment includes the three phases described above, other embodiments can include more, fewer, or different phases.

In one embodiment, the deformation determined by a phase is applied to the hair before the next phase begins. Alternatively, the deformation is stored as an offset, which is applied to the hair later on in the process.

Figure 3:
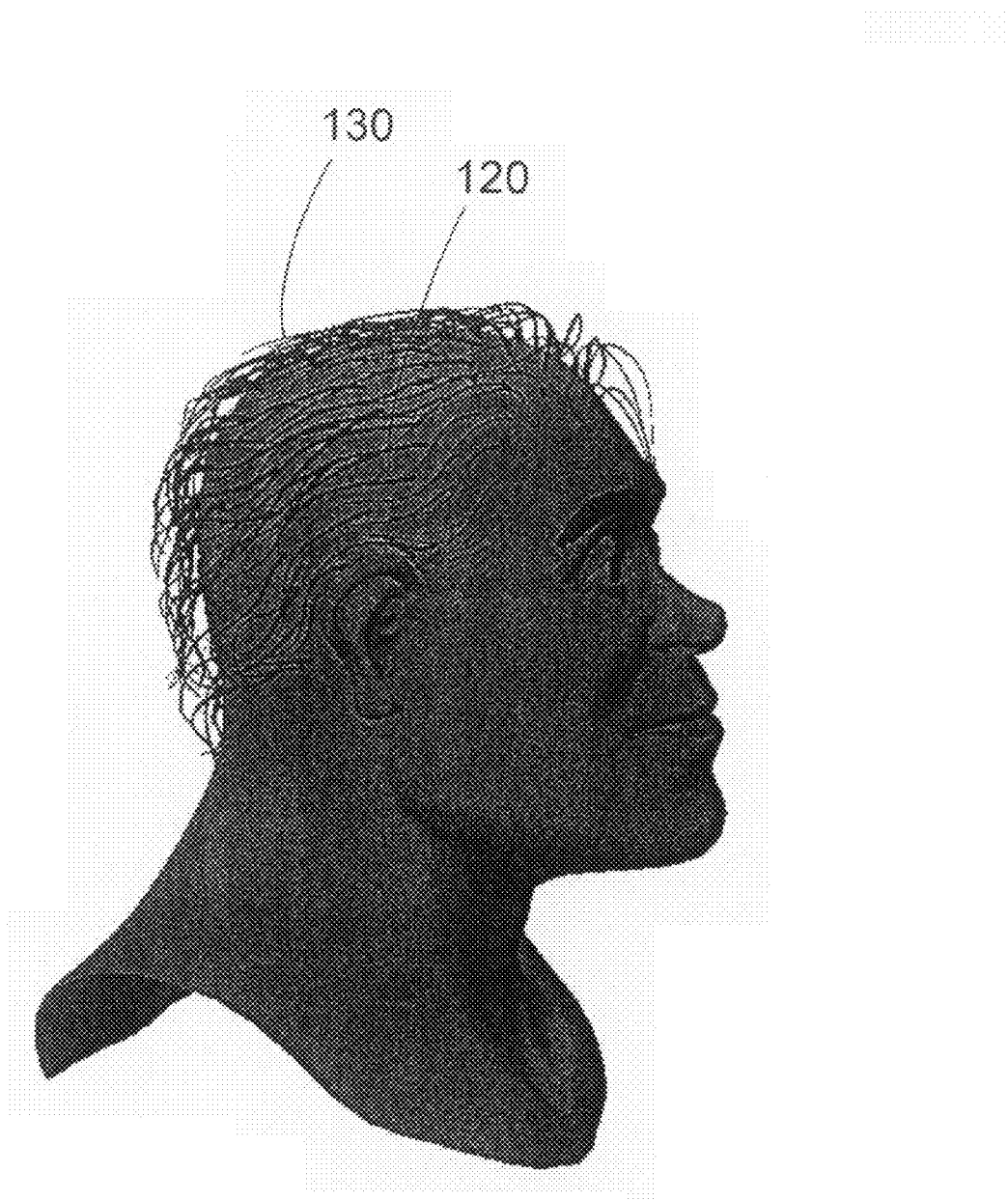
FIG. 3 illustrates a surface model and hairs.

Recall that the wig system 110 takes as inputs a surface model 120, one or more hairs 130, and one or more magnets 140. Before the method begins, a user creates a surface model 120, one or more hairs 130, and one or more magnets 140. A user can create hairs 130 manually, or he can use software to generate hairs based on one or more factors. These factors can include, for example, the desired number of hairs, the region where the hairs should be distributed, how evenly the hairs should be distributed, and the shapes of the hairs. Regardless of how the hairs 130 are created, they are positioned on the surface model 120 before they are input into the wig system 110. FIG. 3 illustrates a surface model and hairs.

A magnet 140 has one or more characteristics associated with it. One of these characteristics, the magnet's position and orientation, was discussed above. Another characteristic is the magnet's weight, which has a value between zero and one. The weight determines to what extent the magnet affects the hair. In one embodiment, the larger a magnet's weight, the greater the effect that the magnet has on the hair. Magnet weights will be further described below.

Figure 4:
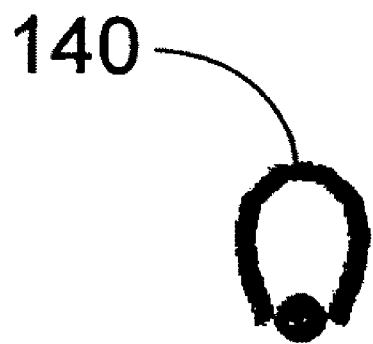
FIG. 4 illustrates an icon representing a magnet.
Figure 5:
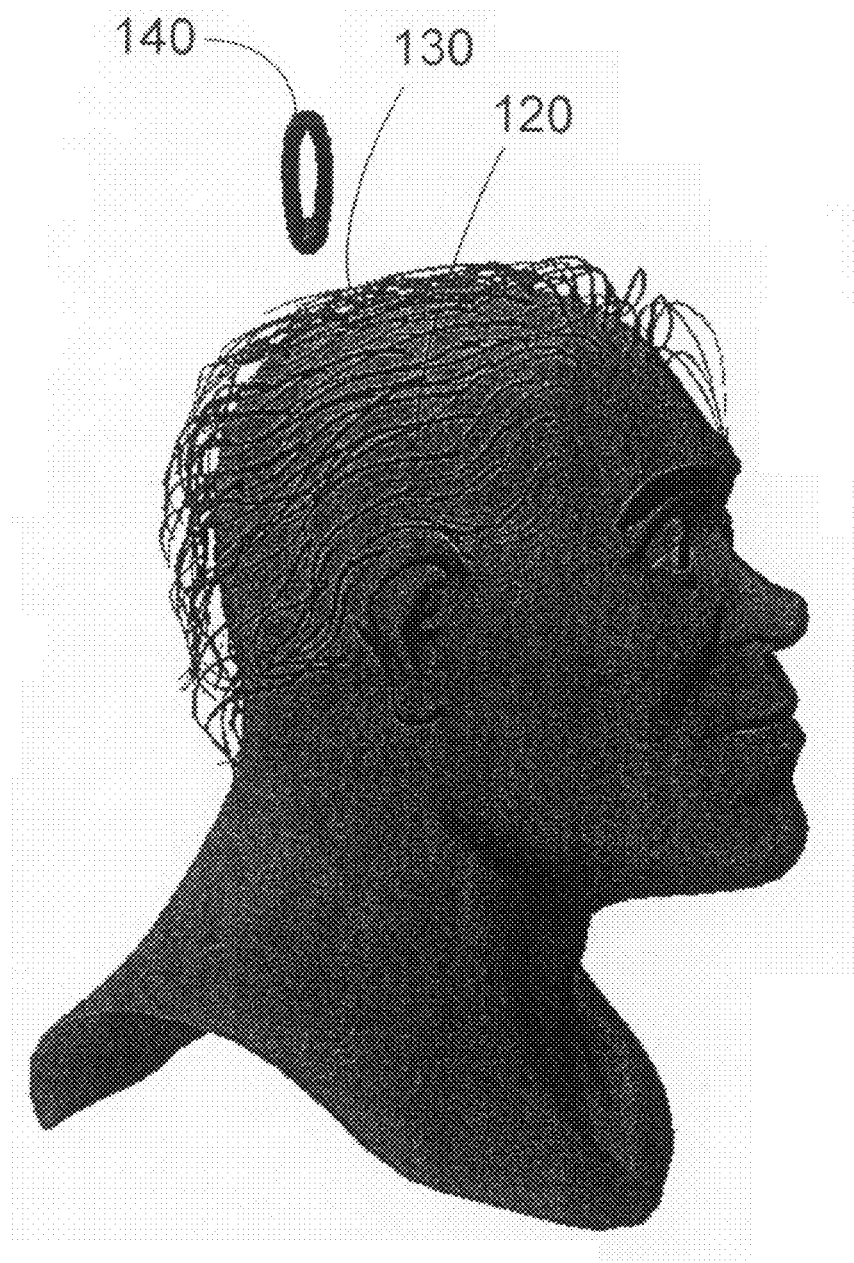
FIG. 5 illustrates the surface model and hairs of FIG. 3 and one magnet.

A user can create one or more magnets 140. Each characteristic of a magnet 140 is assigned a value. The user can specify these values or use default values assigned by the software. A magnet is represented by an icon. FIG. 4 illustrates an icon representing a magnet. The magnet's position determines the icon's location relative to the surface model 120 and hairs 130. FIG. 5 illustrates the surface model and hairs of FIG. 3 and one magnet.

Figure 8A:
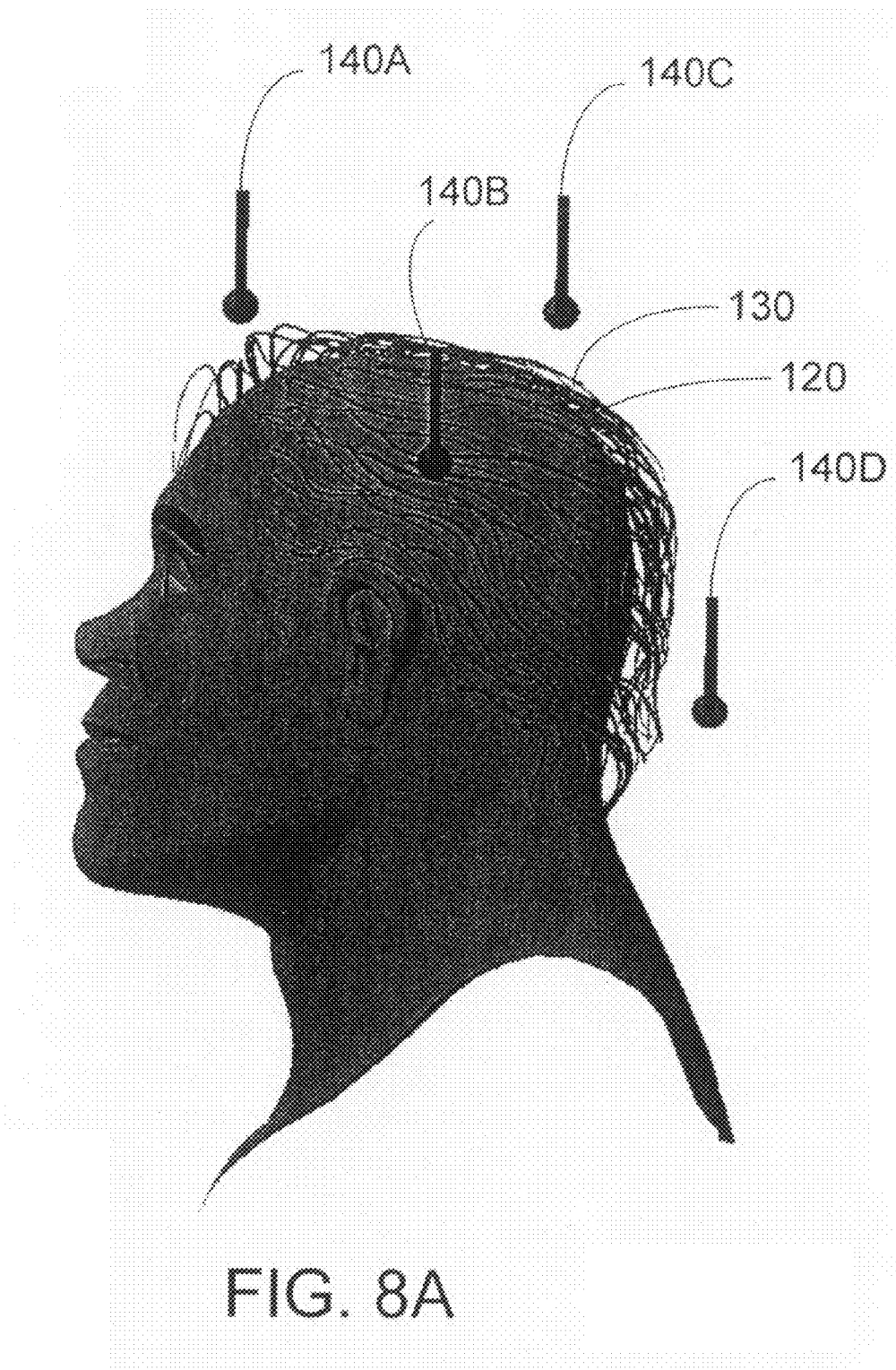
FIG. 8A illustrates a profile view of a surface model, hairs, and multiple magnets.
Figure 8B:
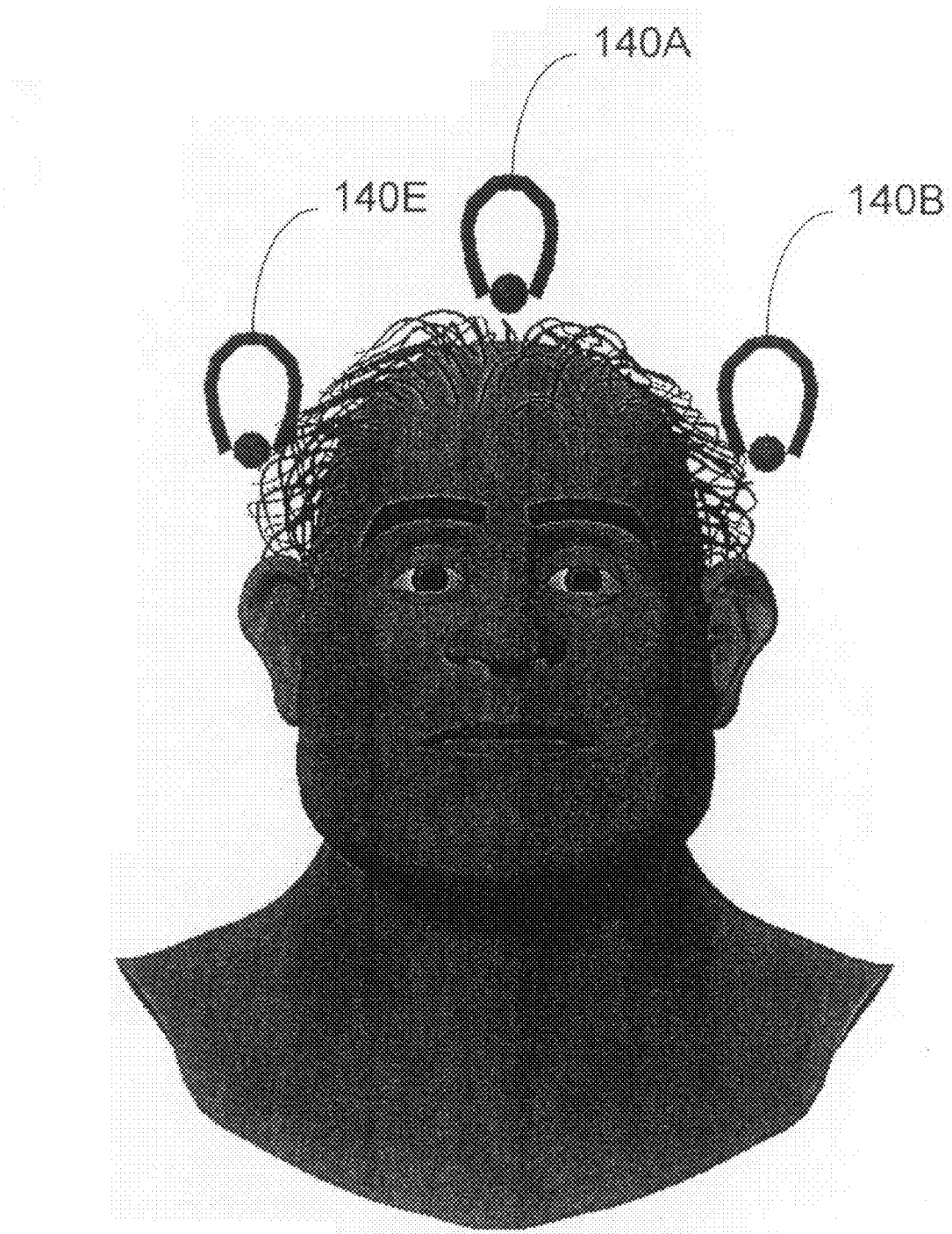
FIG. 8B illustrates a frontal view of the surface model and hairs of FIG. 8A and multiple magnets.

Any number of magnets 140 can be used to deform a given hair. FIGS. 8A and 8B illustrate an example using five magnets 140. In one embodiment, five magnets 140 are used to deform hair. FIG. 8A illustrates a profile view of a surface model, hairs, and multiple magnets. The illustrated embodiment shows four magnets: magnet 140A (located at the top front of the character's head); magnet 140B (located at the middle left side of the character's head); 140C (located at the top back of the character's head); and 140D (located at the bottom back of the character's head). FIG. 8B illustrates a frontal view of the surface model and hairs of FIG. 8A and multiple magnets. The illustrated embodiment shows two magnets that were present in FIG. 8A: magnet 140A (top front) and magnet 140B (middle left). (Magnets 140C and 140D are hidden.) FIG. 8B also shows a fifth magnet 140E that is located at the middle right side of the character's head. Other embodiments can use different numbers of magnets and different magnet locations.

Reference Spaces

Thus far, it has been unnecessary to discuss the three-dimensional space in which magnets and hair vertices are located. They were simply in "global space." However, it can be useful to define other spaces, such as local space and scalp space. For example, local space can be defined relative to the surface model 120 to which the hairs are attached (for example, a character's head). If a character moves its head, its hairs should move in a similar direction. In global space, the coordinates of the hairs attached to the head will change. In local space, however, the coordinates of the hairs will not change. This is because the hairs are still in the same position relative to the head.

Scalp space can be defined relative to a hair's base attachment point and a vector normal to the surface model 120 at that point. If a character's skin moves (for example, by smiling), the hair attached to the skin should move in a similar direction. In global (or even local) space, the coordinates of the hair attached to the skin will change. In scalp space, however, the coordinates of the hair will not change. This is because the hair is still in the same position relative to the base attachment point.

Local space and scalp space are related to global space through transformations. These transformations enable a coordinate in one space to be transformed to a corresponding coordinate in another space. Thus, a deformation in one space can be transformed to a corresponding deformation in another space.

In a pose, a transformation exists from local space to global space. This transformation is specific to the particular pose. If the pose changes (e.g., due the movement of a character's head), the transformation also changes. One way to determine the global coordinates of the character's hairs after deformation is by applying this second (deformation) transformation to the hairs' local coordinates (which have not changed).

For example, when a character's head (the local reference space) moves, its hair vertices move also. If the variable L represents the transformation from local space to global space for the deformed pose, then a vertex located at $p_l$ (a coordinate in local space) in the reference pose would be located at $L*p_l$ (a coordinate in global space) after deformation.

Similarly, when a character's scalp moves, hair attached to the scalp moves also. If the variable S represents the transformation from scalp space to global space for the deformed pose, then a vertex located at $p_s$ (a coordinate in scalp space) in the reference pose would be located at $S*p_s$ (a coordinate in global space) after deformation.

In one embodiment, the deformation caused by scalp movement varies for different vertices in a hair according to an "attachment profile curve." The horizontal axis of the curve represents normalized indices of vertices of the hair, listed in order from the first vertex (attached to the surface model 120 and having an index of zero) to the last vertex (at the end of the hair and having an index of n−1, where n is the number of vertices in the hair). An index j is normalized based on the expression j/(n−1), which will fall between zero and one. The vertical axis represents multiplier values. A multiplier scales the effect of the deformation. For example, if the curve linearly decreases from one to zero, then the root of the hair (with a normalized index of zero) will fully deform according to the scalp movement, while the tip of the hair (with a normalized index of 1) will stay in place and not deform at all.

Primary Movement

Once a surface model 120, one or more hairs 130, and one or more magnets 140 have been created, the deformation method illustrated in FIG. 2 can be applied. The first phase of method 200 controls primary movement and includes deforming 210 the hair 130 based on the magnets 140.

Figure 6A:
FIG. 6A illustrates a magnet.
Figure 6B:
FIG. 6B illustrates the magnet of FIG. 6A (after it has moved) and the magnet's displacement vector.

Recall that a magnet's transformation from one position and orientation ($M_i$) to another ($M_f$) deforms hair. In one embodiment, a magnet's transformation is shown by an arrow, which represents the magnet's displacement vector 600 and points in the direction of the magnet's movement. FIG. 6A illustrates a magnet. FIG. 6B illustrates the magnet of FIG. 6A (after it has moved) and the magnet's displacement vector.

Figure 7A:
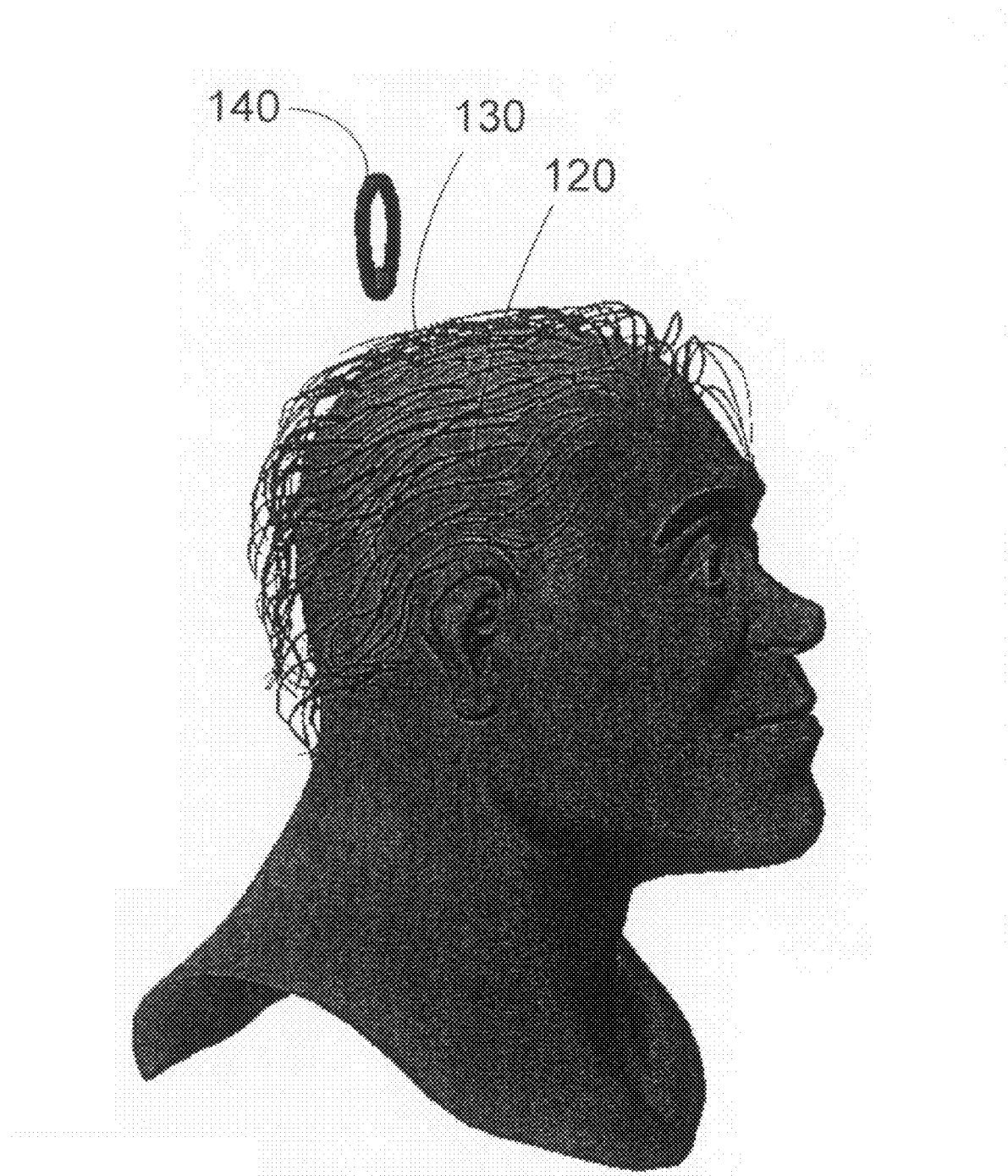
FIG. 7A illustrates the surface model and hairs of FIG. 3 and one magnet.
Figure 7B:
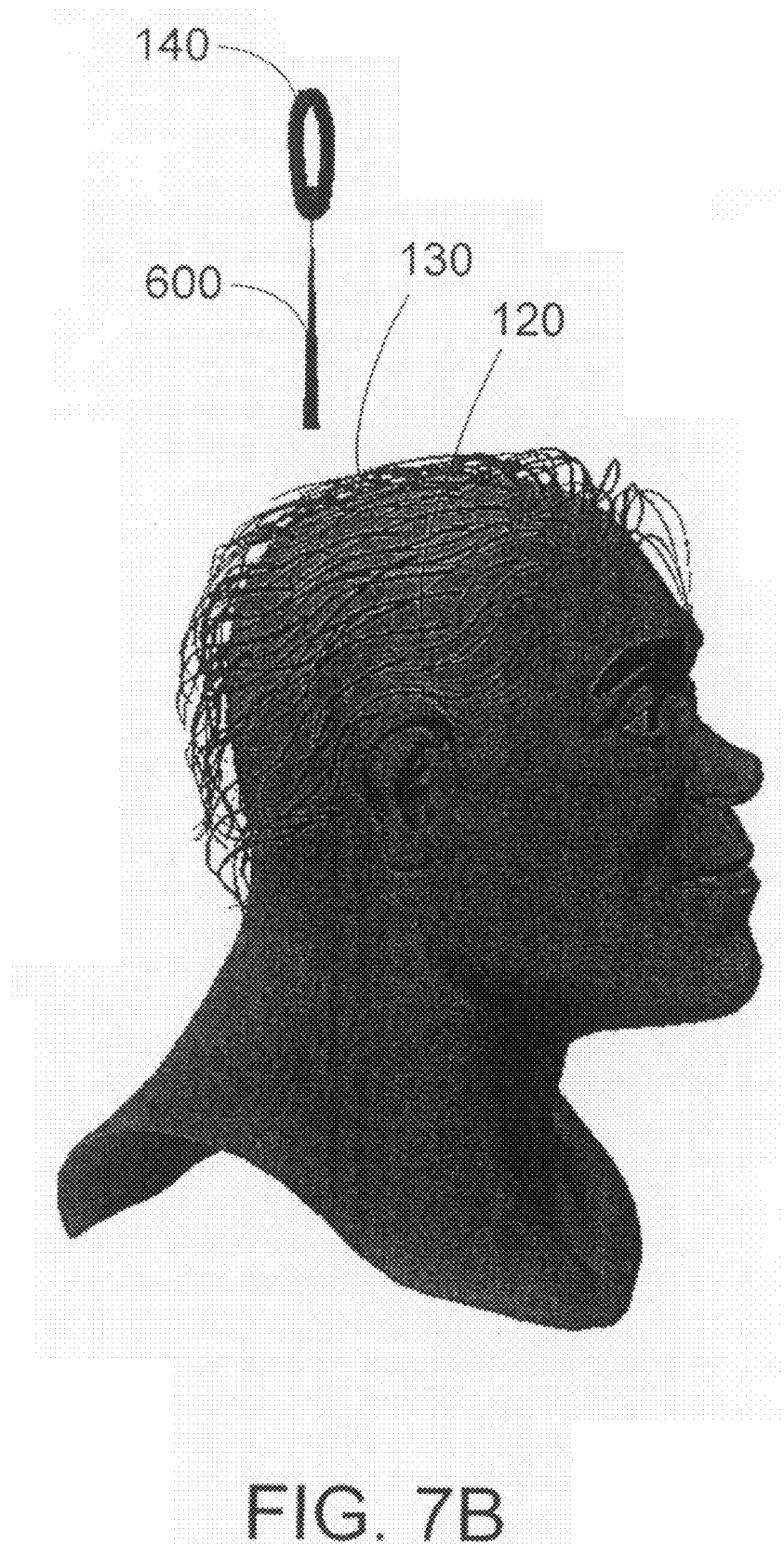
FIG. 7B illustrates the surface model, hairs, and magnet (after it has moved) of FIG. 7A, in addition to the magnet's displacement vector.
Figure 7C:
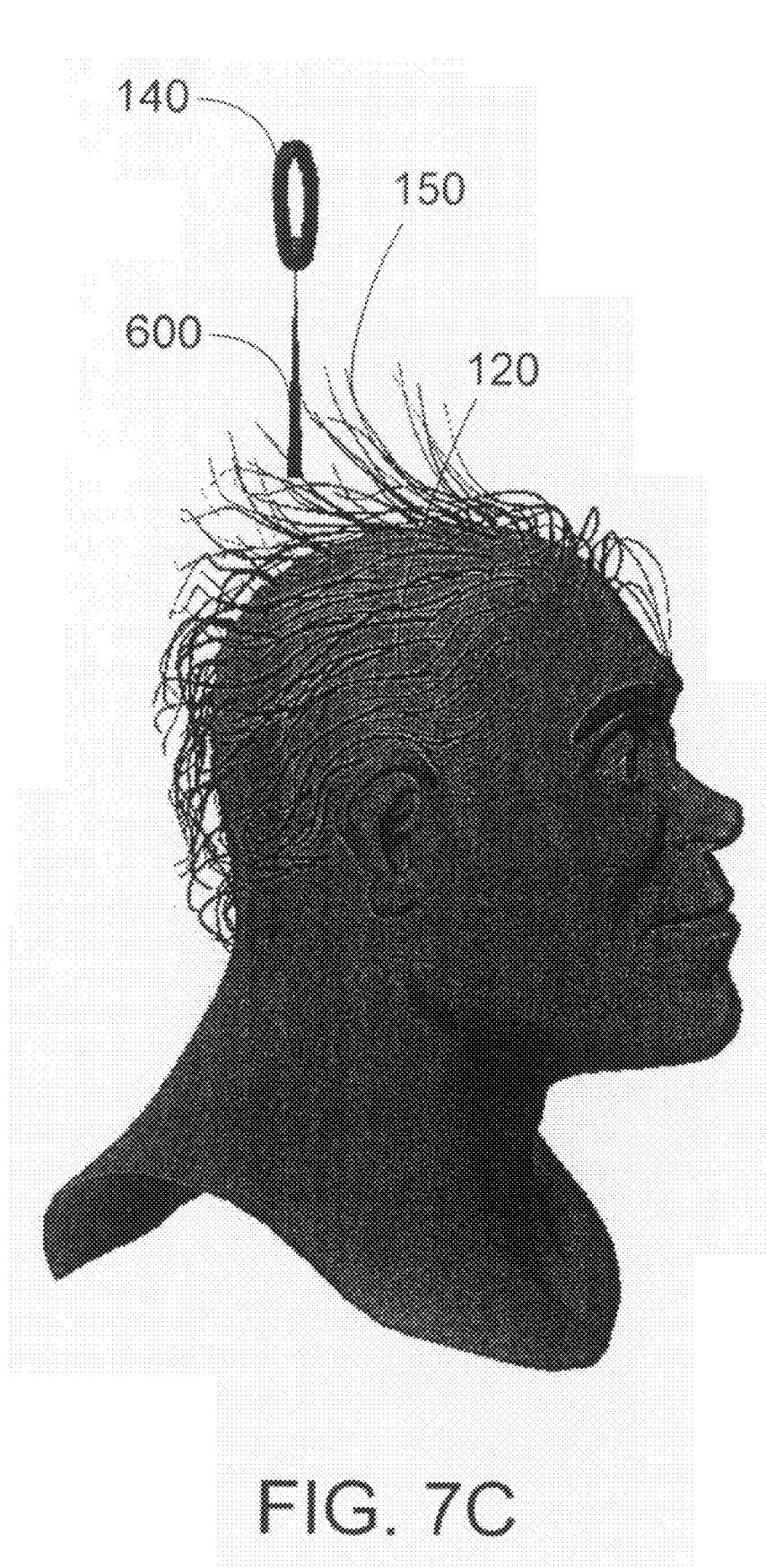
FIG. 7C illustrates the surface model, hairs, magnet (after it has moved), and displacement vector of FIG. 7B, after the displacement vector has deformed the hairs.

FIGS. 7A-7C illustrate the effect that a magnet's transformation has on hair. FIG. 7A illustrates the surface model and hairs of FIG. 3 and one magnet. At this point, the magnet 140 is stationary and the hairs 130 are in their reference pose. FIG. 7B illustrates the surface model, hairs, and magnet (after it has moved) of FIG. 7A, in addition to the magnet's displacement vector. At this point, the magnet 140 has moved (shown by its displacement vector 600), but its transformation has not yet deformed the hairs 130. FIG. 7C illustrates the surface model, hairs, magnet (after it has moved), and displacement vector of FIG. 7B, after the displacement vector has deformed the hairs. The hairs are now in their deformed pose. Note that FIG. 7B is shown for explanatory purposes only. In practice, once a magnet 140 has moved, the hair 130 is deformed immediately or soon thereafter.

In one embodiment, a magnet 140 deforms a hair vertex as if the vertex were rigidly attached to the magnet. Assume that the variable $M_i$ represented the magnet's initial position and orientation, while the variable $M_f$ represented the magnet's final position and orientation. The relationship between $M_i$ and $M_f$ (a deformation transformation) could be determined. This transformation M, a four-by-four matrix, could then be used to determine a vertex's final (deformed) position ($p_f$). If $p_i$ represented a vertex's initial position, then $p_f$ would be equal to $M*p_i$. The displacement of the vertex due to the magnet ($p_f-p_i$) would then be equal to $M*p_i-p_i$.

In one embodiment, this displacement is modified based on one or more characteristics of the vertex, the hair 130 containing the vertex, and/or the magnet 140. For example, a characteristic can determine a "multiplier" that has a value between zero and one and is used to scale the displacement of the vertex due to the magnet. In this situation, the displacement of the vertex would be equal to $\alpha*(M*p_i-p_i)$, where $\alpha$ is the multiplier. As $\alpha$ increases, the vertex's displacement also increases. In other words, the vertex's displacement is modified by a parameterized characteristic.

Figure 9A:
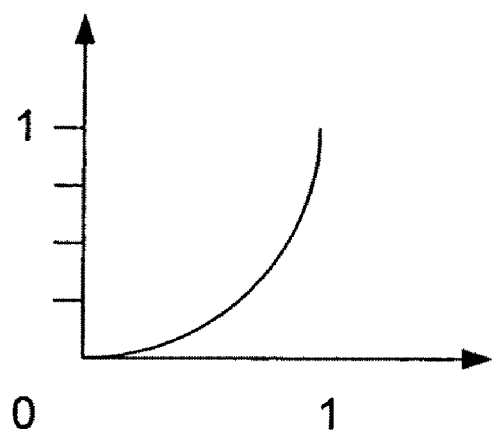
FIG. 9A illustrates a flex profile curve.

A multiplier can be determined, for example, according to a profile curve or according to a formula. For example, a hair 130 can be associated with a "flex profile curve" that indicates a multiplier for each vertex in the hair. FIG. 9A illustrates a flex profile curve. In the illustrated embodiment, the horizontal axis of the flex profile curve represents normalized indices of vertices of the hair 130, listed in order from the first vertex (attached to the surface model 120, having an index of zero) to the last vertex (at the end of the hair, having an index of n−1, where n is the total number of vertices). An index j is normalized based on the expression j/(n−1), which will fall between zero and one. The vertical axis represents multiplier values. In the illustrated embodiment, vertices with normalized indices closer to zero (i.e., those that are closer to the first vertex) would scale the displacement by a fraction closer to zero (and thus move less), while vertices with normalized indices closer to one (i.e., those that are closer to the last vertex) would scale the displacement by a fraction closer to one (and thus move more).

Figure 9B:
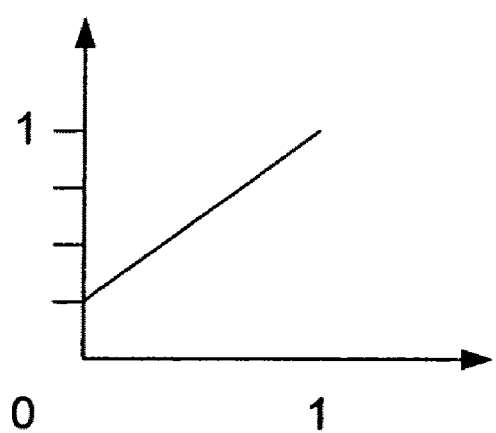
FIG. 9B illustrates a length profile curve.

As another example, a set of hairs 130 can be associated with a "length profile curve" that indicates a multiplier for each hair in the set of hairs. FIG. 9B illustrates a length profile curve. In the illustrated embodiment, the horizontal axis of the length profile curve represents normalized lengths of hairs 130 of the set of hairs, listed in order from shortest to longest. A length l can be normalized, for example, according to the expression $(l-l_{min})/(l_{max}-l_{min})$, where $l_{max}$ represents the length of the longest hair and $l_{min}$ represents the length of the shortest hair. In FIG. 9B, hairs with normalized lengths closer to zero (i.e., those that are shorter) would scale the displacement by a fraction closer to zero (and thus move less), while hairs with normalized lengths closer to one (i.e., those that are longer) would scale the displacement by a fraction closer to one (and thus move more).

As yet another example, a multiplier can be determined by (or be equal to) the weight of a magnet 140. In one embodiment, a magnet's weight is constant across all hairs 130. Alternatively, the weight can vary based on particular hairs or even based on particular vertices within a single hair. For example, a weight can be inversely proportional to the distance between the magnet 140 and a vertex. As this distance increases, the magnet's weight decreases.

In one embodiment, magnet weights are calculated as follows: The distance between a magnet 140 and each vertex (of each hair 130) is determined for the model in its reference (i.e., non-deformed) pose. A function takes a distance as input (where the distance is associated with a particular magnet 140 and a particular vertex) and outputs a weight, which is associated with that magnet 140 relative to that vertex.

In one embodiment, the function is given by the expression $\alpha*(1/x^b)*c(x/d)$, where x represents the distance between the particular magnet 140 and the particular vertex; b represents a distance exponent; and $\alpha$, c, and d represent magnet characteristics (i.e., they are constant for a particular magnet 140 but can vary among magnets). Specifically, $\alpha$ represents a magnet multiplier, c represents a normalized falloff profile curve, and d represents a falloff radius. Thus, c(x/d) means the value of the normalized falloff curve at the location on the horizontal axis equal to x/d. If $\alpha=1$, $b=2$, $d=1$, and c is a constant function equal to 1, the above expression becomes $1/x^2$, a common component of many distance-related equations.

A magnet 140 has an associated weight. If multiple magnets 140 affect the same vertex, then their weights specify their relative effects on the vertex. In one embodiment, their weights are normalized so that the sum of the weights equals one.

Weights can be stored in any type of data structure, such as a three dimensional array W[i][j][k]: one dimension to specify a magnet based on an index (k), one to specify a hair based on an index (i), and one to specify a vertex of the hair based on an index (j). Thus, a value in array W would correspond to the weight of a particular magnet relative to a particular vertex of a particular hair. Computing this weight data structure prior to performing the deformation method decreases the amount of computational resources necessary during the deformation phases.

Recall that a magnet 140 moves from an initial position and orientation ($M_i$) to a final position and orientation ($M_f$). The positional component of $M_i$ is $m_i$, while the positional component of $M_f$ is $m_f$. In one "simple" embodiment, $m_f$ is specified as a particular location $m_{target}$ (e.g., based on user input). In another "dynamic" embodiment, $m_f$ can vary according to a function of $m_{target}$. In this embodiment rather than moving directly to $m_{target}$, the magnet 140 approaches $m_{target}$ as if it were being pulled by a spring-like system that was attached to $m_{target}$. Thus, the magnet's final position $m_f$ might fall short of $m_{target}$ or overshoot it and then swing back into place. This embodiment can also incorporate gravitational or atmospheric effects into the model, which means that they don't have to be modeled separately. Regardless of how the value of $m_f$ is determined, it is then used to determine M, as described above.

Figure 11:
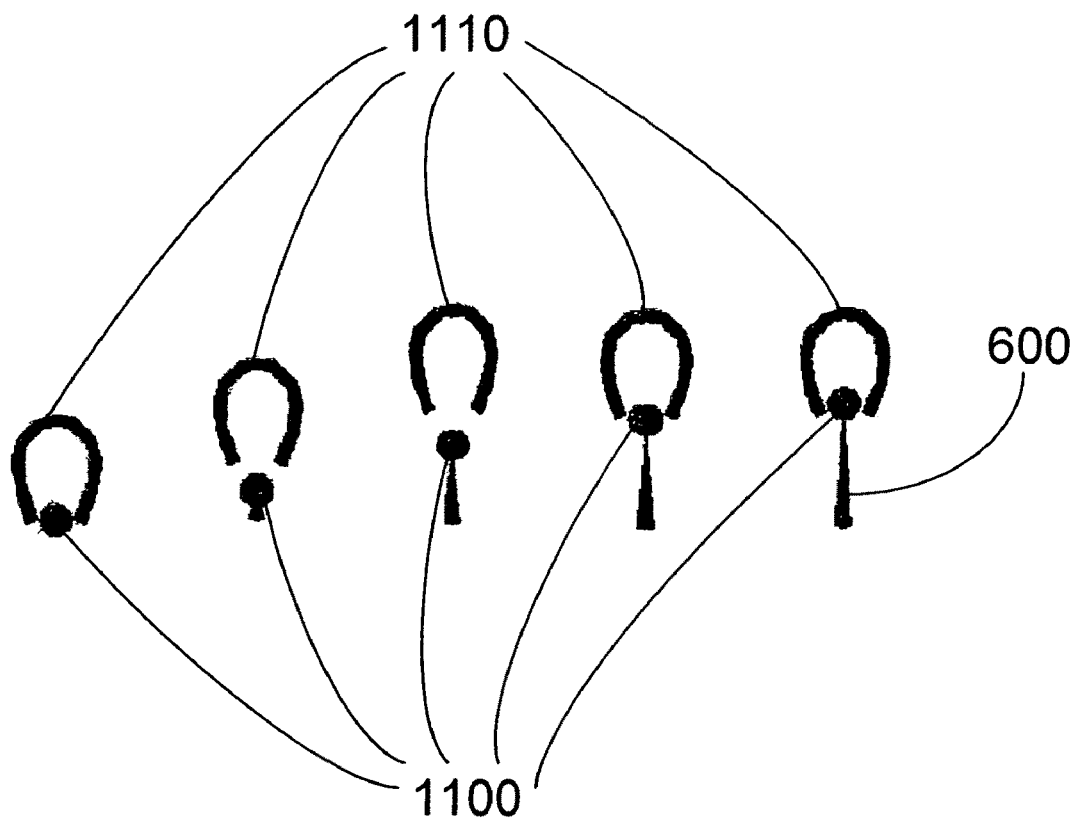
FIG. 11 illustrates a dynamic magnet system over time, as the target location changes and the magnet location changes in response.

In the simple embodiment, one icon is used to refer to both the magnet's location and the target location, since they are equal. In the dynamic embodiment, this icon is divided into two parts to indicate the magnet location 1100 and the target location 1110. The spherical part of the magnet represents the magnet location 1100, while the horseshoe-shaped part represents the target location 1110. Thus, the spherical part approaches the horseshoe-shaped part as if it were attached to the horseshoe-shaped part using a spring-like system. FIG. 11 illustrates a dynamic magnet system over time, as the target location changes and the magnet location changes in response. Since the spherical part represents the magnet's location 1100, the arrow representing the magnet's displacement vector 600 points to the spherical part, not to the horseshoe-shaped part.

Now that the magnet 1100 is no longer moving directly to its target location 1110 ($m_{target}$), its displacement relative to $m_{prev}$ is unknown. One way to determine this displacement is by using the formula d=v*t, where d is the displacement, v is the velocity of the magnet 1100, and t is the time interval during which the magnet was moving at velocity v. In one embodiment, t is the time between two frames of an animation (e.g., 1/24 of a second).

The formula $v=v_{prev}+\alpha*t$, where $v_{prev}$ is the previous velocity of the magnet 1100 (e.g., at the previous simulation step), α is the acceleration of the magnet, and t is the time interval during which the magnet was moving with an acceleration of α, can be used to determine v. The variable α can be determined by using the formula α=F/m, where F is the force on the magnet 1100 and m is the mass of the magnet. In one embodiment, magnets have different masses. In another embodiment, all magnets have masses of 1.

Since a spring is a damped oscillator, the force of the spring on the magnet 1100 is equal to $R*v_{prev}-k*x$, where R represents the spring resistance (damping), k represents the spring constant (stiffness), and x represents the displacement of the magnet 1100 due to the primary deformation (e.g., $m_{target}-m_{prev}$).

After d has been determined, it is added to $m_{prev}$ to determine $m_f$. In one embodiment, $m_f$ is stored for use as $m_{prev}$ in the next simulation step. In another embodiment, after v has been determined, it is stored for use as $v_{prev}$ in the next simulation step. In one embodiment, the values of R and k are constant across all dynamic magnet systems. In another embodiment, the values of R and k vary among dynamic magnet systems.

A dynamic magnet system can be used to simulate gravity by adding a gravitational vector term to the damped oscillator force equation above. Instead of force being equal to $R*v_{prev}-k*x$, force would be equal to $R*v_{prev}-k*x-g*y$, where g represents the gravitational effect (described below) and y represents the unit vector for the vertical axis of the global space.

In one embodiment, the gravitational effect g ranges from zero to $g_{max}$ according to a gravitational profile curve. The horizontal axis of the profile curve represents the angular deviation of the head's vertical axis from a position that is perpendicular to the "ground" and right side up. In one embodiment, this deviation is normalized to fall between zero and one and is equal to (1−u·y)/2, where u represents the unit vector for the head's vertical axis and y represents the unit vector for the global vertical axis (i.e., the axis that is perpendicular to the ground and right side up).

The vertical axis represents multiplier values. In one embodiment, the profile curve is such that head positions with normalized deviations closer to zero (i.e., those that are closer to perpendicular to the ground and right side up) would scale $g_{max}$ by a fraction closer to zero (and thus experience less gravitational effect). Head positions with normalized deviations closer to 0.5 (i.e., those that are closer to parallel to the ground) would scale $g_{max}$ by a fraction closer to 0.5 (and thus experience more gravitational effect). Head positions with indices closer to 1 (i.e., those that are closer to perpendicular to the ground and upside-down) would scale $g_{max}$ by a fraction closer to one (and thus experience the most gravitational effect).

In other words, when a surface model 120 (e.g., a character's head) is in its reference pose, its vertical axis is perpendicular to the ground and right side up, it is collinear with the global vertical axis, and the dot product of their unit vectors equals one. As a result, the normalized deviation equals zero, the gravitational effect on the hairs is zero, and the hairstyle is preserved. As the head angles toward the ground (and further, towards being upside-down), the effect of gravity on the hairs increases and reaches its maximum when the head's vertical axis is perpendicular and upside-down relative to the ground.

Similarly, a dynamic magnet system can be used to simulate atmospheric effects (such as wind) by adding an atmospheric vector term to the damped oscillator force equation above. The atmospheric effect can be constant, or it can vary based on the position of a hair. For example, a hair can be affected only when it is near an open window. In this example, the wind would be similar to a "force field."

In the dynamic embodiment, $m_f$ equals the sum of $m_{prev}$ and v*t, as discussed above. In the simple embodiment, $m_f$ equals $m_{target}$. In one embodiment, a magnet's movement can be entirely "simple," entirely "dynamic," or somewhere in between. This is achieved by determining a value for $m_f$ that falls between $m_{prev}+v*t$ and $m_{target}$. In one embodiment, the difference between these two values is determined and scaled according to a variable called dynablend. The magnet 140 is then placed at a location that is the sum of $m_{target}$ and the scaled value. Specifically, the magnet 140 is placed at $m_{target}$+dynablend*(($m_{prev}+v*t)-m_{target}$).

Secondary Movement

The second phase of deformation method 200 controls secondary movement and includes applying 220 dynamics to the hair 130. This phase is concerned with creating subtle variations in movement among hairs, which makes animation of uniform hairstyles (such as long, straight hair) more lifelike.

For example, it may be desirable that a strand primarily deform from a first position to a second position. This primary deformation can be specified by, for example, the magnet deformation that was described in step 210. Dynamics can be added to this hair movement by using dynamic magnets, as described above. However, dynamic magnets affect all hairs in the same way (albeit with some variation based on profile curves). If this amount of variation is insufficient, secondary motion can be added. In one embodiment, this motion is achieved by deforming strands according to a spring-like system.

Recall that a strand is a collection of vertices. Each vertex has a previous position $p_{prev}$ and a target position $p_{target}$. In one embodiment, $p_{prev}$ is where the vertex is in the previous frame, and $p_{target}$ is where the vertex should be after the primary deformation ends. Rather than move directly from $p_{prev}$ to $p_{target}$, a vertex moves as if it were being pulled by a spring, similar to the dynamic magnet system described above.

Now that the vertex is no longer moving directly to $p_{target}$, its displacement relative to $p_{prev}$ is unknown. One way to determine this displacement is by using the formula $d=v*t$, where d is the displacement, v is the velocity of the vertex, and t is the time interval during which the vertex was moving at velocity v. In one embodiment, t is the time between two frames of an animation (e.g., 1/24 of a second).

The formula $v=v_{prev}+\alpha*t$, where $v_{prev}$ is the previous velocity of the vertex (e.g., at the previous simulation step), $\alpha$ is the acceleration of the vertex, and t is the time during which the vertex was moving with an acceleration of $\alpha$, can be used to determine v. The variable $\alpha$ can be determined by using the formula $\alpha=F/m$, where F is the force on the vertex and m is the mass of the vertex. In one embodiment, vertices have different masses. In another embodiment, all vertices have masses of 1.

Since a spring is a damped oscillator, the force of the spring on the vertex is equal to $R*v_{prev}-k*x$, where R represents the spring resistance (damping), k represents the spring constant (stiffness), and x represents the displacement of the vertex due to the primary deformation (e.g., $p_{target}-p_{prev}$).

After d has been determined, it is added to $p_{prev}$ to determine the vertex's final position. In one embodiment, this final position is stored for use as $p_{prev}$ in the next simulation step. In another embodiment, after v has been determined it is stored for use as $v_{prev}$ in the next simulation step.

In one embodiment, the values of R and k are constant across all vertices in all hairs. In another embodiment, the values of R and k are constant across all vertices in one hair, but can be randomized between hairs (e.g., at a rate of ±20%). In yet another embodiment, the values of R and k can vary across all vertices, even in the same hair.

If secondary dynamics are applied to a hair, a hair vertex moves from $p_{prev}$ to $p_{prev}+v*t$, as described above. If secondary dynamics are not applied to a hair, then a hair vertex moves from $p_{prev}$ to $p_{target}$ (unless the magnet is dynamic). In one embodiment, a vertex's movement can have no secondary dynamics, full secondary dynamics, or something in between. This is achieved by determining a value for the final position of the vertex that falls between $p_{prev}+v*t$ and $p_{target}$. In one embodiment, the difference between these two values is determined and scaled according to a variable called dynablend. The vertex is then placed at a location that is the sum of $p_{target}$ and the scaled value. Specifically, the vertex is placed at $p_{target}+\text{dynablend}*(p_{prev}+v*t)-p_{target})$.

Refinement

In the third phase, the deformation caused by the first two phases is refined. This phase includes compensating 230 for compression, controlling 240 length, and detecting 250 collisions. At the end of the third phase, the wig system 110 has deformed the input hairs 130 to produce deformed output hairs 150.

The first step in refinement is to compensate 230 for compression of the hair. This step produces the visual impression that hairs are colliding with each other and with the surface model 120. In one embodiment, this is achieved by modifying a vertex's deformation so that the vertex does not move as far toward the surface model 120.

For example, assume that a hair vertex p is supposed to be deformed according to a displacement vector d. Vector d could be, for example, the sum of p's primary deformation (as determined in step 210) and p's secondary deformation (as determined in step 220). However, if p actually deformed according to vector d, it would approach (and possibly "collide" with) with the surface model 120 and/or other hairs. In reality, the surface model and hairs would exert force on the deformed hair, decreasing its deformation in a particular direction. In order to simulate this interaction, p's deformation in that direction is compressed according to an algorithm.

Figure 10:
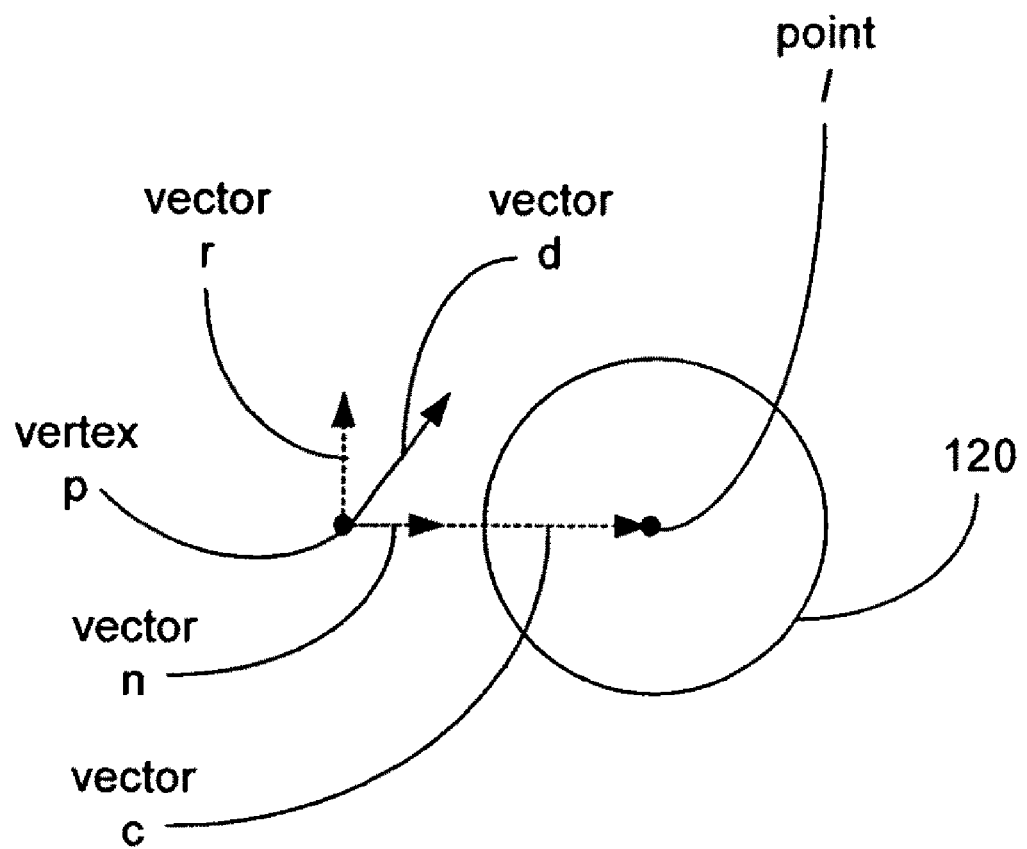
FIG. 10 illustrates a displacement vector, a compression vector, and a surface model.

FIG. 10 illustrates a displacement vector, a compression vector, and a surface model. Surface model 120 represents, for example, a character's head. In the center of this space is a point l ("l" for local space). Attached to surface model 120 are one or more hairs. Although these hairs are not shown, one of their vertices (p) is shown. Vertex p is supposed to deform according to displacement vector d. However, p's deformation in the direction of the surface model 120 should be compressed. This direction is represented by compression vector c, which begins at vertex p and ends at point l.

Vector d can be decomposed into two components. One component, normal vector n, lies along compression vector c. The other component, planar vector r, is perpendicular to normal vector n. In order to simulate interaction between the hair containing vertex p and the surface model 120 (or another hair), normal vector n is modified. In one embodiment, vector n is scaled by a multiplier $\alpha$, which can have a value between zero and one.

For example, when $\alpha$ equals 1, vector n is unchanged, and the vertex's deformation in the direction of compression vector c is unchanged (no compensation for compression). When $\alpha$ equals zero, vector n becomes zero, and the vertex does not deform at all in the direction of compression vector c (full compensation for compression). When $\alpha$ equals 0.5, vector n is half as large, and the vertex's deformation in the direction of compression vector c is partially compensated for compression. Multiplier $\alpha$ can be determined, for example, according to a compression profile curve, where the horizontal axis represents indices of vertices of a hair and the vertical axis represents multiplier values.

Once vector n has been modified, it is added to planar vector r to yield a new displacement vector for vertex p. This new displacement vector simulates collisions by compensating for compression.

The next step in refinement is to control 240 the length of the hair. The deformation process causes vertices of a hair to move, and sometimes they move towards each other or away from each other. This can cause the hair's length to decrease or increase, respectively. This step modifies the deformed hair so that its length is controlled relative to the hair's original length (i.e., in its reference pose). In one embodiment, this is achieved by determining a ratio of the hair's original length to its deformed length and then using this ratio to modify the positions of the vertices.

In one embodiment, a vertex's new position is determined as follows: An offset vector is determined that is equal to the difference between the deformed positions of the vertex and the previous vertex (i.e., the adjacent vertex in the direction of the base attachment point) after it has been modified. This offset vector is then scaled as will be discussed below. The vertex's new position is then the sum of the deformed position of the previous vertex (after it has been modified) and the scaled offset vector. Since a vertex's new position is determined by the new position of a previous vertex, in one embodiment, the first vertex (i.e., the one closest to the base attachment point) remains in its deformed position.

The offset vector is scaled by the value of the expression elasticity+ratio*(1−elasticity), where ratio represents the ratio of the hair's original length and its deformed length. The variable elasticity represents a value between zero and one, where zero indicates that no elasticity (e.g., shortening or elongation) is allowed. When elasticity equals zero, the offset vector is scaled by ratio, which means that the hair's original length is preserved. When elasticity equals one, the offset vector is scaled by one (i.e., not scaled), which means that the hair's length is not controlled.

In one embodiment, a hair's length is approximated by the sum of the stepwise linear distances between adjacent vertices. This value is an approximation because the hair is actually a curve between adjacent vertices, not a straight line.

The next step in refinement is to detect 250 collisions between hairs and the surface model 120. The deformation process causes vertices of a hair to move, and sometimes they move to positions "within" the surface model 120. For example, a hair could deform to a position inside a character's head. This step modifies the deformed hair so that its vertices are not located within the surface model 120. In one embodiment, this is achieved by "pushing" a vertex that is located inside the surface model 120 to the edge of the surface model.

In one embodiment, a ray/object intersection function is used to detect whether a vertex is located inside the surface model 120. A ray vector is determined that starts from the center of the surface model 120 (similar to point l described above) and travels through the vertex. The ray/object intersection function then determines whether the ray intersects the surface model 120 and, if it does, determines the location of the intersection. This location is used to determine the distance between the center of the surface model 120 and the intersection point.

This distance is then compared to the distance between the center of the surface model 120 and the vertex. If the first distance is longer than the second distance, then the vertex is located inside the surface model 120. If this is the case, the vertex is "pushed" along the ray vector to the edge of the surface model 120. Specifically, the vertex is displaced by a vector that starts at the vertex and ends at the intersection of the ray vector and the surface model 120. Pushing a vertex out of the surface model can cause the hair's length to change. In this situation, step 240 can be repeated to control the length of the hair.

Although the invention has been described in considerable detail with reference to certain embodiments thereof, other embodiments are possible as will be understood to those skilled in the art.

What is claimed is:

1. A computer-implemented method of animating hair, the method comprising:
   performing a first simulation to deform sets of hairs using pose controllers,
      each set of hairs having a plurality of individual hairs,
      wherein, for any one of the sets of hairs, one or more of the pose controllers are applied to all of the individual hairs of the set of hairs together to deform all of the individual hairs together; and
   performing a second simulation to apply dynamics to one or more of the individual hairs of the sets of hairs,
      wherein, for any one of the sets of hairs, the dynamics are applied separately to the individual hairs of the set of hairs, and
      wherein, for any individual hair in any one of the sets of hairs, a first deformation is applied to a vertex of the individual hair in the first simulation and a second deformation is applied to the same vertex in the second simulation.

2. The method of claim 1, wherein the pose controllers are magnets, and wherein performing the first simulation includes:
   for any one of the sets of hairs, deforming the individual hairs of the set of hairs together based on a movement of at least one magnet from an initial position to a final position.

3. The method of claim 2, wherein each individual hair is defined using a set of vertices, wherein each individual hair is associated with a flex profile curve defining a multiplier value for each vertex, wherein the multiplier value is used to scale the deformation of the vertex due to a magnet.

4. The method of claim 3, wherein the multiplier value is determined based on a weight of the magnet.

5. The method of claim 2, wherein the hair is disposed on a head of an animated character, and wherein performing the first simulation further includes:
   defining an angular deviation of a vertical axis of the head from a position perpendicular to ground, the angular deviation defined based on a dot product between a first unit vector for the vertical axis and a second unit vector for a global vertical axis, the global vertical axis being perpendicular to ground; and
   adding a gravitational effect to the deformation of an individual hair using the defined angular deviation.

6. The method of claim 5, wherein the dot product is equal to one when the vertical axis of the head is collinear with the global vertical axis and increases when the vertical axis of the head moves away from the global vertical axis.

7. The method of claim 1, wherein performing the second simulation includes:
   defining the deformations of vertices of individual hairs using a spring system for an individual vertex of an individual hair.

8. The method of claim 1, further comprising:
   performing an additional deformation to compensate for compression of individual hairs.

9. The method of claim 8, wherein performing an additional deformation includes:
   obtaining a displacement vector for a vertex of an individual hair, the displacement vector defining the deformation of the vertex;
   obtaining a compression vector for the vertex;
   decomposing the displacement vector into a normal vector and a planar vector, wherein the normal vector lies along the compression vector and the planar vector is perpendicular to the normal vector;

scaling the normal vector in the direction of the compression vector by a multiplier; and adding the scaled normal vector to the planar vector to define a new displacement vector for the vertex.

10. The method of claim 8, wherein performing an additional deformation includes:

detecting collision of vertices of individual hairs with a surface.

11. The method of claim 10, wherein detecting collision comprises:

determining whether a vertex of an individual hair is located within a surface model; and modifying the location of the vertex if the vertex is located within the surface model.

12. A non-transitory computer-readable storage medium having computer-executable instructions for animating hair, comprising instructions for:

performing a first simulation to deform sets of hairs using pose controllers,
  each set of hairs having a plurality of individual hairs,
  wherein, for any one of the sets of hairs, one or more of the pose controllers are applied to all of the individual hairs of the set of hairs together to deform all of the individual hairs together; and performing a second simulation to apply dynamics to one or more of the individual hairs of the sets of hairs,
  wherein, for any one of the sets of hairs, the dynamics are applied separately to the individual hairs of the set of hairs, and
  wherein, for any individual hair in any one of the sets of hairs, a first deformation is applied to a vertex of the individual hair in the first simulation and a second deformation is applied to the same vertex in the second simulation.

13. The non-transitory computer-readable storage medium of claim 12, wherein the pose controllers are magnets, and wherein performing the first simulation includes instructions for:

for any one of the sets of hairs, deforming the individual hairs of the set of hairs together based on a movement of at least one magnet from an initial position to a final position.

14. The non-transitory computer-readable storage medium of claim 13, wherein each individual hair is defined using a set of vertices, wherein each individual hair is associated with a flex profile curve defining a multiplier value for each vertex, wherein the multiplier value is used to scale the deformation of the vertex due to a magnet.

15. The non-transitory computer-readable storage medium of claim 13, wherein the hair is disposed on a head of an animated character, and wherein performing the first simulation further includes instructions for:

defining an angular deviation of a vertical axis of the head from a position perpendicular to ground, the angular deviation defined based on a dot product between a first unit vector for the vertical axis and a second unit vector for a global vertical axis, the global vertical axis being perpendicular to ground; and adding a gravitational effect to the deformation of an individual hair using the defined angular deviation.

16. The non-transitory computer-readable storage medium of claim 12, wherein performing the second simulation includes instructions for:

defining the deformations of vertices of individual hairs using a spring system for an individual vertex of an individual hair.

17. The non-transitory computer-readable storage medium of claim 12, further comprising instructions for:

obtaining a displacement vector for a vertex of an individual hair, the displacement vector defining the deformation of the vertex;

obtaining a compression vector for the vertex;

decomposing the displacement vector into a normal vector and a planar vector, wherein the normal vector lies along the compression vector and the planar vector is perpendicular to the normal vector;

scaling the normal vector in the direction of the compression vector by a multiplier; and adding the scaled normal vector to the planar vector to define a new displacement vector for the vertex.

18. The non-transitory computer-readable storage medium of claim 12, further comprising instructions for:

detecting collision of vertices of individual hairs with a surface.

19. The non-transitory computer-readable storage medium of claim 18, wherein detecting collision comprises instructions for:

determining whether a vertex of an individual hair is located within a surface model; and modifying the location of the vertex if the vertex is located within the surface model.

20. A computer system for animating hair, comprising:

a data store configured to store sets of hairs and pose controllers; and a wig system configured to:
  perform a first simulation to deform the sets of hairs using the pose controllers,
    each set of hairs having a plurality of individual hairs,
    wherein, for any one of the sets of hairs, one or more of the pose controllers are applied to all of the individual hairs of the set of hairs together to deform all of the individual hairs together; and
  perform a second simulation to apply dynamics to one or more of the individual hairs of the sets of hairs,
    wherein, for any one of the sets of hairs, the dynamics are applied separately to the individual hairs of the set of hairs, and
    wherein, for any individual hair in any one of the sets of hairs, a first deformation is applied to a vertex of the individual hair in the first simulation and a second deformation is applied to the same vertex in the second simulation.

* * * * *